US006778218B1

(12) United States Patent
Higuchi et al.

(10) Patent No.: US 6,778,218 B1
(45) Date of Patent: Aug. 17, 2004

(54) ELECTRONIC IMAGE PICKUP APPARATUS

(75) Inventors: Tatsuji Higuchi, Akiruno (JP); Yu Sato, Hino (JP)

(73) Assignee: Olympus Corporatiion, Tokyo (JP)

( * ) Notice: Subject to any disclaimer, the term of this patent is extended or adjusted under 35 U.S.C. 154(b) by 0 days.

(21) Appl. No.: 09/145,540

(22) Filed: Sep. 2, 1998

(30) Foreign Application Priority Data

Sep. 5, 1997 (JP) .............................................. 9-241233

(51) Int. Cl.⁷ .......................... H04N 5/225; G03B 13/08
(52) U.S. Cl. ...................... 348/344; 348/340; 348/341; 348/373; 396/385; 396/386; 359/850; 359/857
(58) Field of Search .......................... 348/374, 64, 341, 348/340, 344, 373; 396/429, 373, 384, 385, 386; 359/850, 857

(56) References Cited

U.S. PATENT DOCUMENTS

| | | | | |
|---|---|---|---|---|
| 4,237,492 A | * | 12/1980 | Roth et al. ................... | 348/164 |
| 4,268,119 A | * | 5/1981 | Hartmann ................... | 348/338 |
| 4,591,901 A | * | 5/1986 | Andrevski ................... | 348/265 |
| 5,161,025 A | * | 11/1992 | Nakao ........................ | 358/224 |
| 5,847,881 A | * | 12/1998 | Yano .......................... | 359/355 |
| 5,862,419 A | * | 1/1999 | Goto et al. ................. | 396/121 |
| 5,920,347 A | * | 7/1999 | Aoki .......................... | 348/339 |
| 6,020,982 A | * | 2/2000 | Yamauchi et al. .......... | 358/444 |
| 6,130,714 A | * | 10/2000 | Abe et al. ................... | 348/335 |
| 6,157,478 A | * | 12/2000 | Naiki et al. ................. | 347/243 |
| 6,369,854 B2 | * | 4/2002 | Ishida et al. ................ | 348/335 |

* cited by examiner

*Primary Examiner*—Andrew Christensen
*Assistant Examiner*—Brian Genco
(74) *Attorney, Agent, or Firm*—Volpe and Koenig, P. C.

(57) ABSTRACT

In an electronic image pickup apparatus, a beam splitter and an image pickup element are incorporated into an optical finder unit together with optical parts used for an optical finder. The optical finder unit includes a finder case for receiving the optical parts used for the optical finder and a holding member for holding the beam splitter and the image pickup element. The image pickup element has an image pickup surface which is inclined to the light beams incident upon the beam splitter. The light beam incident upon the image pickup element is reflected twice in the beam splitter, while the light beam incident upon the optical finder penetrates the beam splitter without being reflected.

10 Claims, 3 Drawing Sheets

ELECTRONIC IMAGE PICKUP APPARATUS

BACKGROUND OF THE INVENTION

The present invention relates to a single-lens reflex electronic image pickup apparatus and, more particularly, to an improvement in mechanism of an optical system of an electronic image pickup apparatus.

A generally-used single-lens reflex electronic image pickup apparatus in which a subject image formed through a lens is directly observed by an optical finder, has the following features. The apparatus causes no parallax and consumes little power as compared with an apparatus having an LCD finder. The electronic image pickup apparatus can be constituted chiefly of an image pickup unit and a finder unit.

The image pickup unit includes a lens unit for forming a subject image, a beam splitter for splitting a light beam, and an image pickup element for converting a formed optical image into an electric signal.

The finder unit is provided on one of plural light emitting surfaces of the beam splitter, and optical parts of an optical finder are arranged along the optical axis. The beam splitter has a 45° reflection surface, and its through-beam is guided to the image pickup element and its reflected beam is guided to the finder unit.

Jpn. Pat. Appln. KOKAI Publication No. 6-160942 discloses an optical finder which has been known conventionally. The optical finder includes a reflector for reflecting light incident through an image pickup unit of a camera and a reticle plate having a field frame pattern. The inclination angle of the reflector to the optical axis of the incident light can be adjusted, and the reflector can be swung with respect to an axis parallel to the optical axis. The reticle plate is supported such that it can be rotated about the optical axis.

In the above optical finder, the position of a subject image is adjusted up or down by adjusting the inclination angle of the reflector. Since the reflector is swung with respect to the axis, the subject image is moved right or left. If the reticle plate is rotated, the relative position of the subject image and field frame is adjusted.

The foregoing conventional electronic image pickup apparatus has the following problem. Since the size of an image pickup element such as a CCD is much smaller than that of a silver-salt film, high precision is required for the mechanism of the image pickup unit, especially a single lens, a lens mirror frame and a lens moving mechanism of the lens unit. Since, in particular, a single-lens reflex electronic image pickup apparatus is a high-grade one, it requires high optical performance, with the result that the time for adjusting and inspecting the lens unit is considerably longer than that for doing the finder unit.

To resolve the above problem, the lens unit having a number of parts to be adjusted and inspected can be combined with both a beam splitter and an image pickup element, which need not be adjusted in particular, into a single unit. However, this throws a product line out of balance and requires an extra attention to prevent the lens unit from being damaged when it is disassembled or reassembled. Furthermore, most of electronic cameras are not adaptable to the combination of the beam splitter and image pickup element because they are assembled by selectively combining a plurality of lenses and a plurality of image pickup elements having different numbers of pixels.

Since the conventional electronic image pickup apparatus is so constituted that a through-beam of the beam splitter is guided to the image pickup element, the image pickup element is arranged behind the beam splitter, thereby increasing the dimensions of the apparatus in its front-to-back direction. In particular, a camera having a plurality of circuit boards stacked at its front and back, such as an electronic camera, is increased more greatly in dimensions in the front-to-back direction.

The balance between through-light and reflected light of the beam splitter is varied according to whether a beam incident upon the beam splitter is polarized or not. If, therefore, the polarized beam is present in a portion of a subject, a difference in luminance between the light incident on the image pickup element and that incident on the finder is caused in the portion of the subject. The degree of influence of such a polarized beam is proportionate to the incident angle or the reflection angle on the reflection surface of the beam splitter. Consequently, it is desirable that the incident angle or reflection angle be smaller than 45°.

BRIEF SUMMARY OF THE INVENTION

An object of the present invention is to provide an electronic image pickup apparatus in which a beam splitter and an image pickup element are incorporated into an optical finder unit together with optical parts used for an optical finder to protect the beam splitter and image pickup element, which are expensive, even when a lens system is troubled, and the image pickup element is detached from the lens system and replaced with another as required to quickly respond to a model change.

Another object of the present invention is to provide an electronic image pickup apparatus in which a beam splitter and an image pickup element are combined into a small unit to improve the precision of collimation between the emitting surface of the beam splitter and the image pickup element and to facilitate the management and assembly of the beam splitter and image pickup element when the apparatus is produced.

Still another object of the present invention is to provide an electronic image pickup apparatus in which an image pickup surface of an image pickup element is inclined to the light beam incident upon a beam splitter to decrease the dimensions of a lens system in its optical axis direction and thus decrease the dimensions of the apparatus in its front-to-back direction.

To attain the above objects, the electronic image pickup apparatus of the present invention has the following characteristic constitution. The other characteristic constitution will be clarified later in the description of the embodiment.

According to the present invention, there is provided an electronic image pickup apparatus in which a light beam of a subject image penetrating an image pickup lens is split into light beams by a beam splitter, one of the light beams is converted into an electrical signal by an image pickup element and then recorded, and other light beam is observed by an optical finder, wherein the beam splitter and the image pickup element are incorporated in an optical finder unit together with optical parts used for the optical finder.

DETAILED DESCRIPTION OF THE INVENTION

Embodiment

Figure 1:
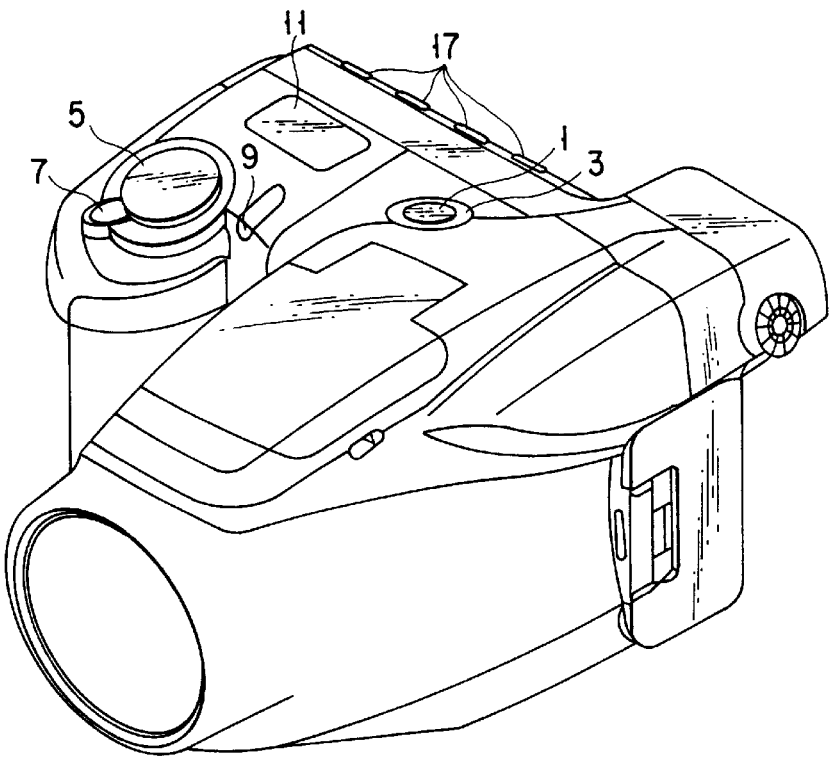
FIG. 1 is a perspective view of the front of an electronic image pickup apparatus (electronic camera) according to an embodiment of the present invention.
Figure 2:
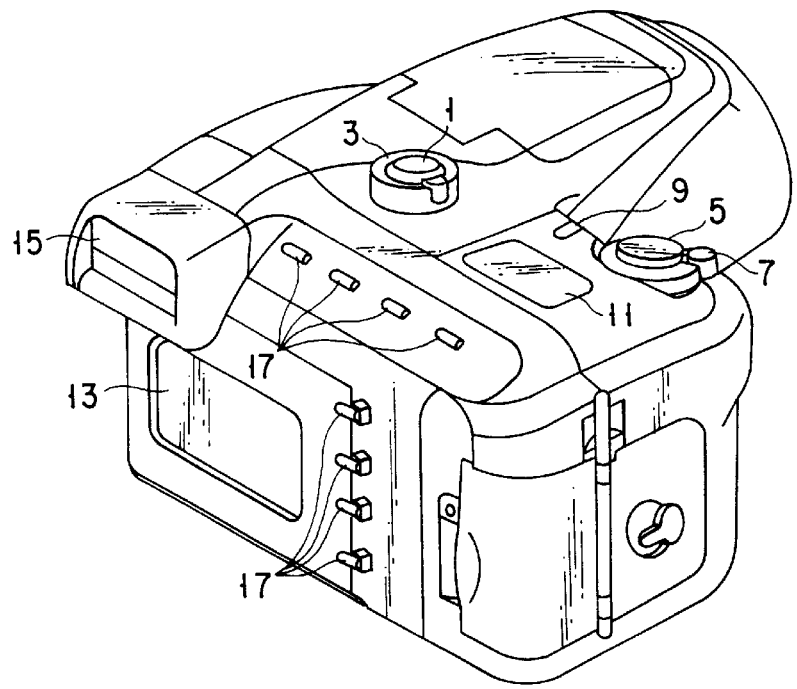
FIG. 2 is a perspective view of the back of the apparatus shown in FIG. 1.

FIGS. 1 and 2 are perspective views of the front and back of an electronic camera according to an embodiment of the present invention. In these figures, reference numeral 1 indicates a power switch; 3, a mode button; 5, a release; 7, a zoom knob; 9, a light-emitting diode (LED); 11, a liquid crystal display (LCD) for displaying control data and the like; 13, another liquid crystal display (LCD) for displaying image pickup data; 15, a finder window; and 17, mode buttons for setting various modes.

Figure 3:
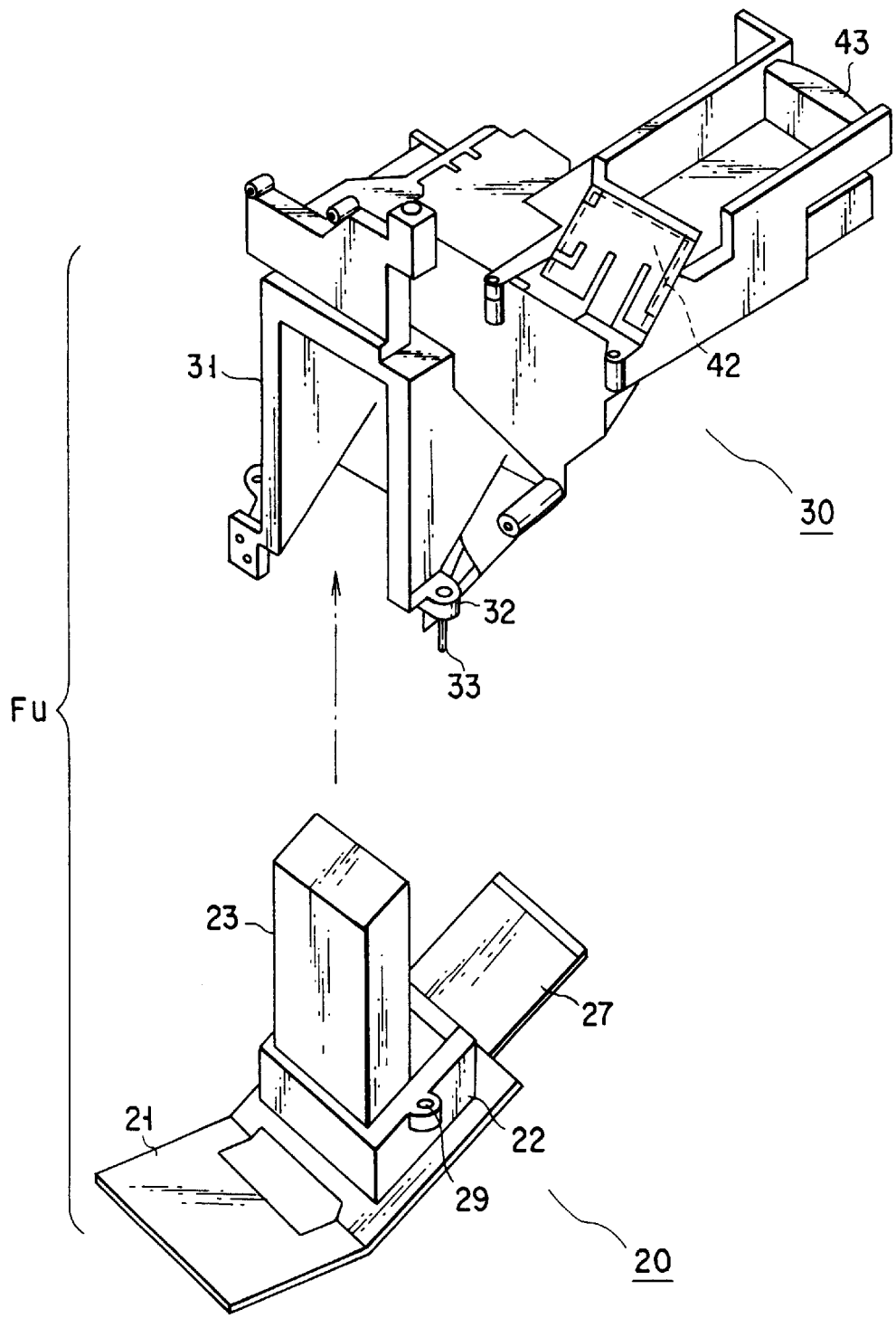
FIG. 3 is an exploded, perspective view of an optical finder unit of the apparatus shown in FIGS. 1 and 2.
Figure 4:
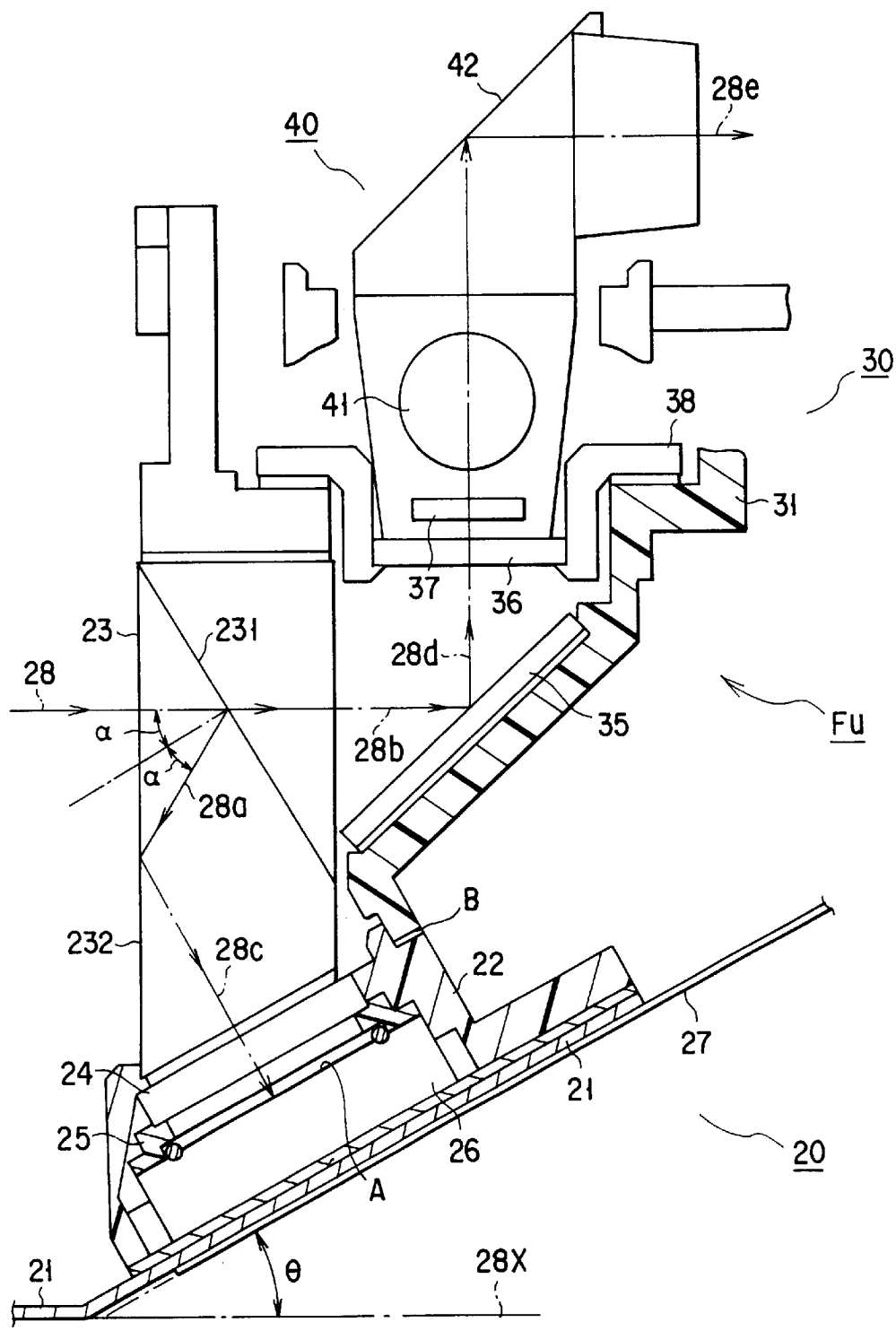
FIG. 4 is a cross-sectional view illustrating the constitution of a beam splitter and an image pickup element of the optical finder unit shown in FIG. 3.

FIG. 3 is an exploded, perspective view of an optical finder unit FU which is an essential component of the present invention, and FIG. 4 is a cross-sectional view chiefly showing the constitution of a beam splitter and an image pickup element in the optical finder unit FU. Since the unit FU is secured to the mounting surface of a lens unit of the camera body, which is perpendicular to the optical axis of a lens, it can be detached from the body when the need arises.

As illustrated in FIG. 3, the optical finder unit FU is constituted mainly of a holder 20 for holding the beam splitter and the image pickup element and a finder case 30 capable of receiving optical parts used for a finder and incorporating the holder 20 therein as one component, as indicated by the arrow.

The holder 20 includes an aluminum plate 21, a supporting member 22 fixed on the aluminum plate 21, and a beam splitter 23 fixed to the supporting member 22 by an adhesive or the like. As shown in FIG. 4, the holder 20 also includes a low-pass filter 24 the surface of which is provided with an evaporated coat for blocking infrared rays, an image pickup element 26, and a rectangular rubber-made elastic member 25 with a vacant center which is interposed between the filter 24 and element 26. The low-pass filter 24, elastic member 25 and image pickup element 26 are located in the holder 20 inward more than the beam splitter 23.

The surface area of the image pickup element 26 is pressed by the elastic member 25 compressed in the holder 20, and the underside thereof is pressed on the aluminum plate 21. The underside of the element 26, which serves as a reference surface, and the mounting surface of the member 22 are adhered to the aluminum plate 21, and they are flush with each other. Thus, the image pickup element 26 is positioned in the optical axis direction. The aluminum plate 21 also serves as a heat dissipation plate for dissipating the heat generated from both the image pickup element 26 and its positioning substrate. The aluminum plate 21 has two rows of long holes (not shown) from which the leads of the underside of the element 26 are guided. The leads are soldered to a wiring portion of a flexible wiring board 27 one end portion of which is fixed to the aluminum plate 21 and the other end portion of which is processed such that it can be connected to a connector (not shown).

Referring to FIG. 4, the image pickup element 26 is provided not behind but diagonally under the beam splitter 23. In other words, the image pickup surface A of the element 26 is inclined at an angle of θ to a line 28X which is parallel with the optical axis of light beam 28 incident upon the beam splitter 23. For this reason, the dimensions of the lens can be reduced in its optical axis direction and thus those of the electronic camera can be decreased in its front-to-back direction.

Two lug portions 29 (only one is shown in FIG. 3) are provided on both sides of the supporting member 22 of the holder 20 so as to be protruded outwardly. By coupling each of the lug portions 29 to a lug portion 32 of a main body 31 of the finder case 30 by a screw 33, the holder 20 and finder case 30 are formed integrally as one component as shown in FIG. 4. The mounting surface B between the holder 20 and finder case 30 is parallel with the image pickup surface A of the element 26.

The internal structure of the finder case 30 will now be described. A first mirror 35 and a third mirror (not shown) are adhered to the finder case 30, and a second mirror (not shown) is pressed and fixed by a spring plate. A field frame 36 and a square, plastic condenser lens 37 are held by a field frame holding member 38.

The field frame 36 is constituted of a rectangular frame of a thin metal plate and fitted into a recess portion of the field frame holding member 38. An adhesive means can be used to fit the field frame 36 into the holding member 38. The field frame 36 is arranged on an image forming surface such that a user can recognize it clearly. The condenser lens 37 is fixed to the field frame holding member 38 so as to be located near and above the field frame 36.

An operation of the electronic camera so constituted will now be described. As illustrated in FIG. 4, a light beam 28 incident upon the beam splitter 23 from a lens unit (not shown), is split into to two beams 28a and 28b by a half mirror section 231 of the beam splitter 23. More specifically, one beam 28a is reflected by the half mirror section 231 and then totally reflected by a total reflection section 232 of the beam splitter 23. This beam is emitted from the splitter 23 to form an image on the image pickup surface A of the element 26. The other beam 28b penetrating the half mirror section 231, is reflected by the first mirror 35 and guided to an optical finder unit 40.

A light beam 28c is reflected twice in the beam splitter 23 and launched into the image pickup element 26. In other words, the light beam 28c is first reflected by the half mirror section 231 and then reflected by the total reflection section 232. For this reason, an image need not be reversed by an image processing circuit connected to the posterior stage of the image pickup element 26 and instead an electric circuit can be simplified. Since, moreover, a reflection angle a of the reflection surface of the half mirror section 231 is set to be smaller than 45°, an influence of polarization, for example, a difference in luminance between the light incident upon the image pickup element 26 and that incident upon the optical finder unit 40 can be lessened.

The light beam 28b penetrating the beam splitter 23 is reflected by the first mirror 35 upward in FIG. 4. The reflected light beam 28d passes through the field frame 36 and then penetrates the condenser lens 37. After that, the light beam is reflected by the second mirror (not shown) in the left direction of the electronic camera body (in the perpendicular direction to the sheet showing FIG. 4), and penetrates a release lens 41. The light beam is reflected upward by the third mirror (not shown) and then reflected by a prism lens 43 (see FIG. 3) in a back direction of the camera body. The reflected light beam 28e is guided to user's eyes as an optical image enlarged by a predetermined magnification by an eyepiece lens 43 (see FIG. 3).

Features of the Embodiment

[1] In an electronic image pickup apparatus according to the above embodiment, a light beam 28 of a subject image penetrating an image pickup lens is split into light beams 28a and 28b by a beam splitter 23, one of the light beams 28a is converted into an electrical signal by an image pickup element 26 and then recorded, and the other light beam 28b is observed by an optical finder. The electronic image pickup apparatus is characterized in that the beam splitter 23 and image pickup element 26 are incorporated in an optical finder unit FU together with optical parts used for the optical finder.

In the above apparatus, the beam splitter 23 and image pickup element 26, neither of which needs to be adjusted or inspected in particular, is separated from a lens unit, which takes a lot of time to adjust and inspect, and combined with the optical finder unit FU. It is thus unlikely that the beam splitter 23 and image pickup element 26, which are expensive, will be disposed of simultaneously even when the lens unit is troubled, thus eliminating waste. Furthermore, when a specific image pickup element is selected for the lens unit, the element 26 can easily be replaced therewith to quickly respond to a model change.

[2] In the electronic image pickup apparatus as described in the above item [1], the optical finder unit FU includes a finder case 30 for receiving and holding the optical parts used for the optical finder and a holder 20 for receiving and holding the beam splitter 23 and the image pickup element 26.

Since, in the above apparatus, the beam splitter 23 and image pickup element 26 can be combined into a small unit, the precision of collimation between the emitting surface of the beam splitter 23 and the image pickup element 26 can be secured. Moreover, the management of the beam splitter and image pickup element can be facilitated and the assembly thereof can be improved when the apparatus is produced.

[3] In the electronic image pickup apparatus as described in the above item [2], the beam splitter 23 is adhesively fixed to the holder 20.

In the above apparatus, even though a relative great shock or continuous vibration is applied to a relatively heavy beam splitter 23, the splitter 23 is unlikely to shift in position in the holding member.

[4] In the electronic image pickup apparatus as described in any one of the above items [1] to [3], the image pickup element 26 has an image pickup surface which is inclined to the light beams incident upon the beam splitter 23.

In the above apparatus, the image pickup element 26 cannot be mounted behind the beam splitter 23 but diagonally under the beam splitter 23, as illustrated in FIG. 4. Thus, the dimensions of the lens unit can be decreased in its optical axis direction and so can be those of the apparatus in its front-to-back direction.

[5] In the electronic image pickup apparatus as described in the above item [4], a light beam 28c incident upon the image pickup element 26 is reflected twice in the beam splitter 23, and the light beam 28b incident upon the optical finder penetrates the beam splitter 23 without being reflected.

Since, in the above apparatus, an image need not be reversed in an image processing circuit, an electric circuit can be simplified. If an angle of the first reflection to the reflection surface is set to be smaller than 45°, an influence of polarization can be lessened.

What is claimed is:

1. An electronic image pickup apparatus, comprising:
   a beam splitter to split a first light beam of a subject image that penetrates an image pickup lens into second and third light beams, the beam splitter having a light-incident surface on which the first light beam is incident, a first light-emitting surface parallel to the light-incident surface from which the second light beam is emitted without being reflected and then guided to the finder optical system, and a second light-emitting surface inclined to the light-incident surface by which the third light beam is reflected twice and from which the third light beam is emitted and then guided to the image pickup element;
   a finder optical system to receive the second light beam to observe the subject image;
   an image pickup element contained in a holder to convert the third light beam into an electrical signal; and
   an optical finder unit comprising the holder in which the beam splitter and the image pickup element are positioned and fixed and a finder case that holds the finder optical system therein;
   wherein the optical finder unit is detachable from the electronic image pickup apparatus.

2. The electronic image pickup apparatus according to claim 1, wherein the beam splitter includes a bonding surface to bond two optical elements together and the third light beam is reflected by the bonding surface, reflected by the light-incident surface and then emitted from the second light-emitting surface.

3. The electronic image pickup apparatus according to claim 1, wherein the image pickup element is arranged parallel to and opposed to the second light-emitting surface.

4. The electronic image pickup apparatus according to claim 1, wherein the finder optical system includes a plurality of mirrors to reflect the light beam, which is emitted from the first light-emitting surface, a plurality of times.

5. An electronic image pickup apparatus comprising:
   a beam splitter to split a first light beam of a subject image that penetrates an image pickup lens into second and third light beams;
   a finder optical system to receive the second light beam to observe the subject image;
   an image pickup element contained in a holder to convert the third light beam into an electrical signal; and
   an optical finder unit comprising the holder in which the beam splitter and the image pickup element are positioned and fixed and a finder case that holds the finder optical system therein;
   wherein the optical finder unit is detachable from the electronic image pickup apparatus and the holder are detachable from the finder case.

6. An electronic image pickup apparatus comprising:
   a beam splitter having a bonding surface to bond two optical elements together, which splits a light beam of a subject image, which penetrates an image pickup lens, into two light beams on the bonding surface;
   an image pickup element which converts one of the two light beams into an electrical signal;
   a finder optical system which receives either of the two light beams to observe the subject image;
   a holder which holds the beam splitter and the image pickup element that are positioned and fixed therein; and
   a finder case having a main body which holds the finder optical system and in which the holder is detachably incorporated,
   wherein the holder and the finder case are formed integrally with each other as one optical finder unit which is detachable from the electronic image pickup apparatus.

7. The electronic image pickup apparatus according to claim 6, wherein the beam splitter has a light-incident surface on which the light beam of the subject image is incident, a first light-emitting surface parallel to the light-incident surface, from which the light beam incident on the light-incident surface is emitted without being reflected and then guided to the finder optical system, and a second light-emitting surface inclined to the light-incident surface, by which the light beam incident on the light-incident surface is reflected twice and from which the twice-reflected light beam is emitted and then guided to the image pickup element.

8. The electronic image pickup apparatus according to claim 7, wherein the light beam guided to the image pickup element is a light beam which is incident on the light-incident surface of the beam splitter, reflected by the bonding surface, reflected by the light-incident surface, and then emitted from the second light-emitting surface.

9. The electronic image pickup apparatus according to claim 7, wherein the image pickup element is arranged parallel to and opposed to the second light-emitting surface.

10. The electronic image pickup apparatus according to claim 7, wherein the finder optical system includes a plurality of mirrors to reflect the light beam, which is emitted from the first light-emitting surface, a plurality of times.

* * * * *